(12) United States Patent
Martin

(10) Patent No.: US 8,821,781 B2
(45) Date of Patent: Sep. 2, 2014

(54) FABRICATING OBJECTS WITH INTEGRAL AND CONTOURED REAR PROJECTION

(75) Inventor: Gilles J. Martin, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 440 days.

(21) Appl. No.: 13/166,983

(22) Filed: Jun. 23, 2011

(65) Prior Publication Data

US 2012/0326356 A1 Dec. 27, 2012

(51) Int. Cl.
*B29C 35/08* (2006.01)
*B29C 67/00* (2006.01)

(52) U.S. Cl.
CPC ............................... *B29C 67/0051* (2013.01)
USPC ........................................................ 264/401

(58) Field of Classification Search
CPC .................................................. B29C 67/0051
USPC ....................................................... 264/401
See application file for complete search history.

(56) References Cited

U.S. PATENT DOCUMENTS

2004/0067323 A1* 4/2004 Clabburn et al. ............. 428/1.26
2004/0207123 A1* 10/2004 Patel et al. .................... 264/401

* cited by examiner

*Primary Examiner* — Yogendra Gupta
*Assistant Examiner* — Robert J Grun
(74) *Attorney, Agent, or Firm* — Marsh Fischmann & Breyfogle LLP; Kent A. Lemble

(57) ABSTRACT

A method for manufacturing a three dimensional (3D) object with a rear projection (RP) surface. The method includes providing a rapid prototyping machine, such as a stereolithography machine, with input material, such as a white photopolymer resin. The method includes providing a digital prototyping file, which defines thin, separately grown layers of a digital representation of the 3D object, to a computer control system. With the computer control system, the rapid prototyping machine is operated to form a 3D object using the input material and the digital prototyping file. As a result, the 3D object includes an RP element, which behaves as an RP substrate or surface. A structural portion of the 3D model has a first thickness and an RP portion has a second thickness that is less than the first thickness such that it is translucent to provide an RP element integrally formed with an adjacent structural element.

20 Claims, 5 Drawing Sheets

FABRICATING OBJECTS WITH INTEGRAL AND CONTOURED REAR PROJECTION

BACKGROUND

1. Field of the Description

The present invention relates, in general, to techniques for forming a contoured or non-planar substrate or structure that can be used for rear projection (RP) such as the eyes or other portions of an animatronic or robotic character, and, more particularly, to a method of fabricating an object with a rear projection (RP) substrate or RP screen element that may be contoured or dimensional and is integrally formed with an adjacent structural substrate(s) or a non-projecting element(s) of the object. For example, the method may be used to form an RP screen element that provides animated eyes of an animatronic character or creature when light and/or images are projected upon rear surfaces of the RP screen element.

2. Relevant Background

There are many applications where it is useful to provide a rear projection or RP screen within an assembled product. For example, theme parks may provide animatronic creatures and characters in show portions of theme rides or on floats of a parade. To make the creatures and characters come to life it is desirable for their eyes and their other body parts to move.

While it is useful to use mechanical assemblies to move many body parts, robotic-type eyes may seem unrealistic and "give away" the robotic nature of the creature or character. Many designers of animatronics or robotics have, as a result, begun to animate or bring life to eyes through the use of rear projection. In use, an animatronic character's eyes can be provided with one or more RP elements and one or more projectors that project still or video images displaying still or moving eyes. The video projection may be timed or synchronized, for example, with the moving of the head, mouth, and so on or to follow a person observing the character to effectively bring the character to life.

The RP element or substrate can limit the quality of the resulting projection in a number of ways and fabrication of objects or characters with RP substrates has presented difficulties that have not yet been fully addressed. Presently, the fabrication process of such a character involves forming a support structure for the RP elements and then attaching the RP elements. The support structure, for example, may be all or a portion of a character's face or head, and openings or holes will be provided or later cut out of this face or head to provide a place to attach the RP elements. The RP elements are separately formed and then carefully applied to the face or head, and then the projector is positioned within the face or head for use in projecting on the rear surface of the RP elements.

While the above steps may be labor intensive so that they are relatively costly and time consuming, more significant problems with fabrication of the object with RP substrates typically arise in the production of the RP substrates themselves. The RP substrates are typically arcuate or contoured in overall shape (e.g., non-planar) and also have to be formed with particular optical qualities to provide a good RP screen.

To this end, the RP substrate is typically formed using a multi-step process that includes first forming a clear or substantially transparent base substrate or layer such as through vacuum forming with a translucent to transparent plastic. The base substrate typically will have at least one curved or non-planar surface (e.g., a portion of a sphere) or may be thought of as a three-dimensional (3D) surface, but the substrate also preferably has uniform thickness to provide uniform transmission of light. Unfortunately, vacuum forming often provides a product that has varying thickness, and this leads to repeated attempts (or a trial and error-type process) to generate a more uniform thickness base substrate, which increases the time and cost to provide each base substrate. In a typical run, it is has been found that up to 80 percent of the parts have to be rejected due to unacceptable variance in the substrate thickness.

Additional problems arise in the final processing of the base substrate to provide the RP substrate. A typical next step is to apply an RP coating onto the rear or inner surface of the base substrate. The RP coating acts to provide the desired optical properties to the RP substrate such that light providing still and video images are effectively projected via the RP substrate (similar to an RP screen in a movie theater). The RP coatings presently in use are very expensive (e.g., up to $600/gallon), and it may require several coatings to achieve a desired result such as particular optical qualities. Further, the RP coating materials are typically toxic and special spraying facilities or equipment may be required for their use.

The spraying or application process can be complex and challenging, and it often can result in rejected parts due to non-uniformity or flaws in the RP coating layer (e.g., one drip of the RP coating in one of the two or more applications can produce an undesirable RP substrate). These challenges have typically required that manufacturers of animatronic/robotic characters or other objects with RP substrates send the base substrates out to another company (or division) for application of the RP coating, which further adds to the fabrication timeline and increases overall costs.

Hence, there remains a need for an improved method of fabricating RP substrates or elements for use in objects or devices that make use of RP systems to display imagery. Preferably, such a method would reduce the time and/or cost required to fabricate the RP substrate and, therefore, the object or RP assembly that includes the RP substrates. The method also may be selected or designed to better provide uniform optical qualities across or throughout each RP substrate produced by the method (e.g., a more uniform thickness of material(s)).

SUMMARY

To address the above and other needs, the present description describes a method of fabricating a 3D object, such an animatronic head or the like, that includes one or more rear projection (RP) surfaces or substrates. Significantly, the method uses a rapid prototyping machine to concurrently form the RP substrate with its adjacent or surrounding support elements (e.g., a face may be formed with the eyes providing the RP substrate and the forehead, cheeks, and nose providing structural support elements for the RP substrate). For example, the method may include use of a stereolithography machine that is controlled by a computer control system using an input file to define the thin layers of a digital 3D model or computer graphic of the 3D object to sequentially grow or print. The layers are printed or grown using lasers (or other devices) to selectively cure a 2D pattern or slice of the 3D model in a vat or container containing a UV-curable photopolymer resin (or liquid plastic).

In one implementation, the photopolymer is chosen such that when it is cured it provides a rigid, translucent, white plastic, and the opacity or translucence is selected such that the RP substrate has the optical characteristics or qualities of an RP screen. The 3D model is modified or generated such that the RP portions are assigned a thickness that is typically much less than the adjacent/surrounding structural portions so as to provide the desired RP screen-like optical qualities (e.g., 50 percent or less of the thickness of the structural/support portions when these are about 1/16-inch thick and the input/feed material used in the process is a white photopolymer such as ACCURA 55 available from 3D Systems Corporation, Rock Hill, S.C., USA or the like). In this manner, rapid prototyping is used to concurrently and integrally form the structural and RP portions of the 3D object, and the RP portions typically will have uniform thickness and not require any additional coatings or treatments to act as RP screens when projected upon by a projector.

More particularly, a method is provided for manufacturing a three dimensional (3D) object with a rear projection (RP) screen or surface. The method includes providing a rapid prototyping machine and then supplying a volume of input material to the rapid prototyping machine. The method further includes providing a digital prototyping file to a computer control system configured to control the rapid prototyping machine. With the computer control system, the rapid prototyping machine is operated to form a 3D object using the input material based upon the digital prototyping file. As a result or output of the manufacturing method, the 3D object includes an RP element with a rear surface and a front surface. The RP element is adapted for displaying (e.g., imagery that animates the RP element) via the front surface when light is projected upon the rear surface.

In some embodiments of the method, the rapid prototyping machine is a stereolithography machine. In such embodiments, the digital prototyping file may define a plurality of layers of a 3D model (e.g., down to 0.020 inches thick or less) that are separately formed (grown, cured, printed, or the like) by the stereolithography machine. The 3D model may include an RP portion corresponding with the RP element and a structural portion corresponding to a structural element with at least one side integrally and concurrently formed with an adjoining side of the RP element during the operating step. In such cases, the structural portion of the 3D model is associated with a first thickness and the RP portion of the 3D model is associated with a second thickness that is less than the first thickness, whereby the RP element formed by the stereography machine is more transmissive of light than the structural element. For example, the first thickness is greater than about 1/16 inches and the second thickness is less than about 1/32 inches. In some implementations, the input material is a UV-curable photopolymer resin that may be selected to provide a translucent white plastic in the operating step.

According to another aspect of the method, the 3D object further includes a structural element with at least one adjoining edge with the RP element to support the RP element within the 3D object. In such an embodiment, the structural element is formed at least partially concurrently with the RP element during the operating step. In such cases, the method may further include treating the structural element such that the structural element is less transmissive of light than the RP element.

DETAILED DESCRIPTION

Briefly, the following description teaches a method of fabricating a 3D object or part that includes a rear projection (RP) portion or element and, in many embodiments, also includes a structural or support portion or element adjacent and/or surrounding the RP element. In the fabricating method, rapid prototyping such as stereolithogaphy is utilized to grow or print the RP element such that it may be integrally formed with the surrounding and supporting structural element(s). In other words, a 3D part or object is formed that includes both the RP element and one or more structural elements interconnected with one or more edges/sides of the RP element.

The rapid prototyping is performed with an input or feed material or materials that provide the desired optical qualities in the RP element. In this way, additional processing such as applying an RP coating are generally not required to achieve a useful RP screen/surface in the 3D part. Further, the RP element can be formed integrally with the adjacent structural elements/portions but be much thinner or have smaller thickness than the structural elements. The prototyping input or feed material typically provides a translucent RP element that is useful for rear projection applications, and the structural elements may be painted or coated in a later step so as to make these portions opaque to the light from a rear-positioned projection targeting the rear or inner surface of the RP element(s).

The 3D part or object is then used in the final assembly of a RP assembly or system that typically will include at least one projector operable to project onto the rear or inner surface of the RP element. The RP assembly may further include an actuator mechanism(s) for actuating animatronic or robotic features of the RP assembly (e.g., to move a mouth) and a controller for operating the projector(s) and/or the actuator mechanisms (e.g., in a synchronized manner to animate the RP elements with the animatronic or robotic features).

Figure 1:
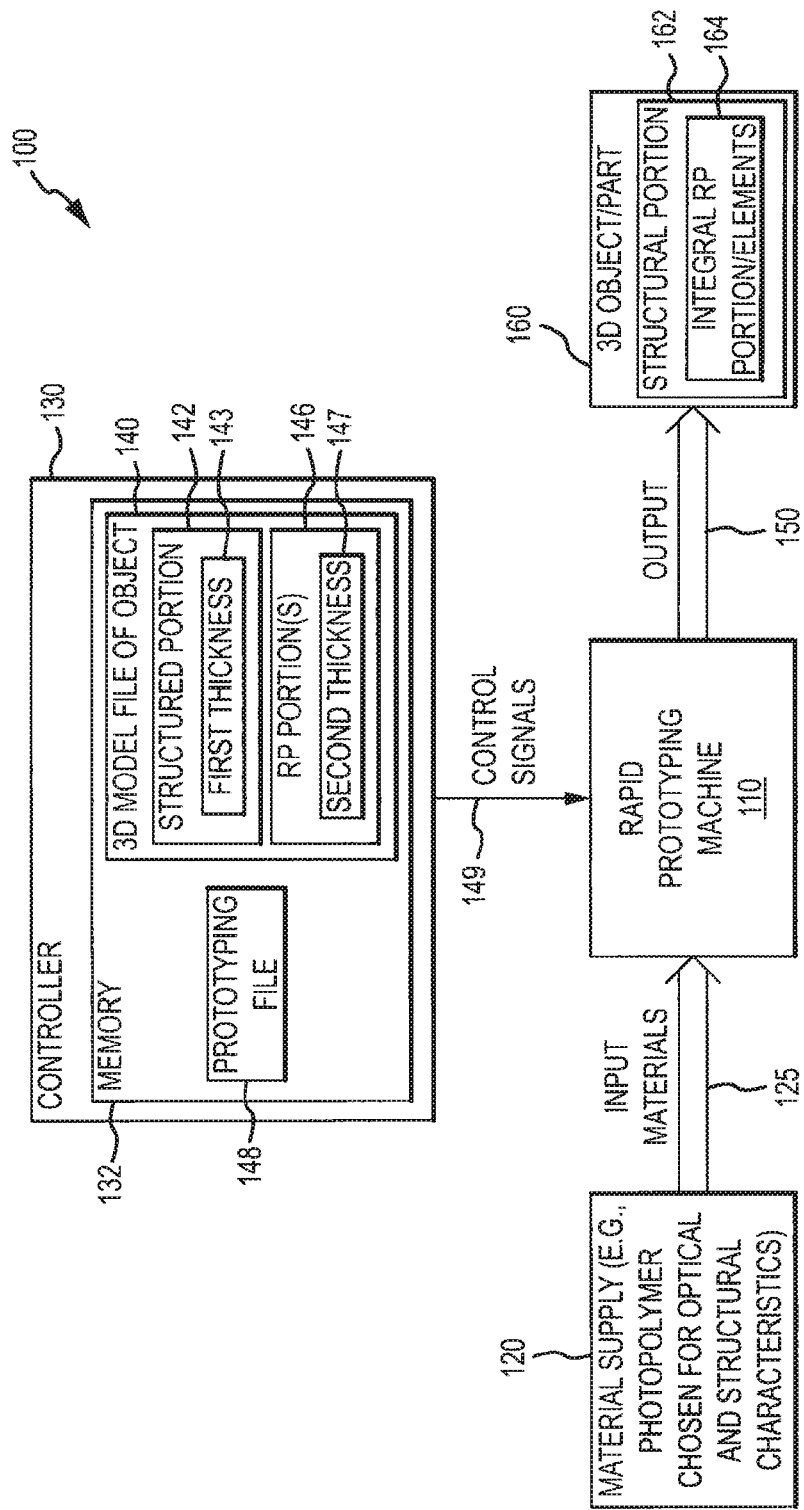
FIG. 1 is a functional block or schematic diagram of a fabrication system for use according to methods of the present description to generate a 3D object or part with an integrally formed RP substrate or portion using rapid prototyping.

FIG. 1 illustrates a fabrication assembly or system 100 for use in producing 3D objects or parts 160 that include an RP portion or element 164. The RP portion 164 typically has at least one curved or otherwise non-planar segment and is configured to be useful in receiving images (such as video or still imagery) on one side (e.g., the back, rear, or inner surface) and to, in response, display the projected image on the opposite side (e.g., the front or outer surface). The 3D object or part 160 typically will also include a structural portion or element(s) 162, and the structural or support element 162 may be adjacent to one or more sides/edges of the RP element 164 or surrounding the entire RP element 164. The RP element 164 may also be formed so as to be integral with the structural element 162, e.g., the two elements 162, 164 may be formed in a single process so that additional bonding or attachments steps are not required to create the 3D object 160.

To this end, the system 100 includes a rapid prototyping machine or device 110 that produces or provides as its output 150 the 3D object 160 with the RP portion 164 integrally formed with the structural/support portion 162. Significantly, the inventor recognized that the difficulties with trying to form RP substrates that are later glued to a structural base (e.g., RP eyes to a face with holes for receiving the RP eyes) could be addressed by fabricating the structural and RP elements 162, 164 in a single process.

Further, the system 100 includes a material supply 120 because the inventor understood that if the input materials 125 provided to the rapid prototyping machine 110 are properly selected to provide useful optical properties of an RP substrate in RP element 164 then additional coatings and processing are not required. Additionally, the inventor recognized that the rapid prototyping machine 110 could be chosen such that it may be run controlled to produce an RP portion 164 of the 3D object/part 160 that is thinner than the structural portion 162. This allows each element 162, 164 to perform its design function (e.g., one acting to transmit light as an RP substrate and one acting to support the RP substrate and otherwise provide structural integrity to the 3D object).

A wide variety of rapid prototyping machines/devices exist and may be utilized for machine 110 to provide the output 150 described herein such as non-photopolymer-based devices such as fusion deposition modeling, laser sintering, and an inkjet system. However, in one useful example of system 100, the rapid prototyping machine 110 takes the form of a stereolithograpy device (sometimes also called solid-state stereolithography or 3D printing device). In general, stereolithography is an additive manufacturing process using input materials 125 in the form of a liquid UV or otherwise-curable photopolymer resin (or liquid plastic). A laser (e.g., a UV laser) prints or builds/grows 3D parts or objects one thin layer at a time. On each layer of the 3D object 160, the laser beam of the machine 110 traces a part cross-sectional pattern on the surface of the liquid resin 125. Exposure to the UV laser light cures or solidifies the material 125 in the pattern traced on the resin/liquid plastic and adheres it to the layer immediately below or previously-formed layer.

After a layer is traced or grown, a platform supporting the 3D object being formed is lowered by a single layer thickness (e.g., 0.002 to 0.020 inches or the like). Then, a resin/liquid plastic-filled blade sweeps across the part cross section to coat it with fresh material 125. On this new liquid, the next layer of the 3D object 160 is traced with the laser and adheres to the prior layer. This process is repeated until a complete 3D object/part 160 may be provided as the output 150 of the machine 110. Supports or supporting materials may be provided by the machine 110 to maintain the structural integrity to prevent deformation during gravity and/or from movement with the refill blade. Also, additional processing such as cleaning of excess resin and/or curing in a UV oven or the like may be performed for some stereolithography machines 110.

The system 100 further includes a controller or computer control system 130 that acts to selectively provide control signals 149 to the rapid prototyping machine 110 to operate to create the output 150. For example, the controller/computer control system 130 may act to direct a laser across the surface of a polymerizable plastic in a pattern defined by a prototyping file 148 in its memory 132. This converts the input liquid materials 125 into a solid on a point-by-point basis. The laser converts to solid plastic all the points in one layer that are needed for this layer of a prototyping file 148 (or a layer of model 140) so as to produce a two dimensional lithograph. Then, the control signals 149 may instruct the machine 110 to drop the platform supporting the object being gown a small increment and then grow/print a next layer. Once all layers are converted to solid, the complete 3D object or part 160 can be lifted from the liquid plastic/resin vat as output 150 of the machine 110.

The 3D object/part 160 is a complete model or exact replica of a computer graphic or 3D model. Specifically, the controller 130 may take as input a computer graphic or digital 3D model file 140 of an object that is to be grown/printed as the 3D object/part 160. For example, a computer modeling program such as a computer aided design (CAD) program may be used to create the 3D model file 140 of the object, and the model file 140 may define nearly any 3D structure (as long as it has structural integrity during the building/growing process of machine 110). For example, a 3D scan of an object (such as external surfaces of a character/creature or their head/face) may be taken and used as a starting point for the 3D model file 140.

One unique aspect of the 3D object 160 is that it can include material of two or more thicknesses so that one may provide desired optical characteristics of an RP screen (i.e., elements 164) while the other, thicker portions may be stronger (i.e., support/structural elements 162). Hence, the 3D model of the object 140 may define one or more portions 142 that are used as structural components of the 3D object 160 (structural portion 162), and these may have thickness 143 assigned to them such as $\frac{1}{16}$ to $\frac{1}{8}$-inch or more thick. Depending on the polymer used as the input materials 125, this may be too thick for use as an RP screen.

As shown, though, the 3D model 140 further defines one or more portions 146 that are used as the RP components of 3D object (RP portions 164). These RP portions 146 of the digital 3D model 140 are assigned a second thickness 147 that is less than the thickness 143 of the structural portions 142. For example, some polymers or liquid plastics used as the input 125 may provide excellent optical qualities (e.g., desired transmission of light from a front surface when the light is projected on an opposite rear surface) when at thicknesses of less than $\frac{1}{16}$ inches such as down to $\frac{1}{32}$-inch or less in thickness (e.g., a range of about 0 to $\frac{1}{16}$-inches may be used with some prototypes tested at about $\frac{1}{32}$ inches). The thickness 147 of the RP portions 146 is set to be uniform throughout the RP portion 146, which is an advantage over prior RP substrates formed using vacuum forming as vacuum forming often led to varying thicknesses. The thickness 147 will vary based on a desired result and the intended use of the RP substrate 164 (e.g., how dark or light the use environment will be, the brightness of the projectors that will rear project onto the RP portion 164, and so on).

The controller 132 may then use software (not shown) to chop or separate the 3D model 140 into thin layers (e.g., 5 to 10 millimeters or the like) or cross sectional patterns that are provided in prototyping file 148 in memory 132. The control signals 149 are then generated based on the file 148 to paint or print the 3D object 160 layer-by-layer to provide a 3D replica or model of the object/graphic defined in 3D model file 140. Preferably, the software/programs run by the CPU/processors of controller 130 allow a user to set and then later reset which portions of the 3D model 140 will be used as the structural and RP portions 142, 146 and to set and reset the thicknesses 143, 147. Typically, the model 140 will define a 3D model/shape, and the thicknesses 143, 147 are set as offset distances from the outside surfaces of the 3D model/shape. Such functionality allows a prototype to be grown by machine 110 and tested, and, based on the test, to adjust thicknesses 143, 147 to achieve better or different results (e.g., decrease or increase thickness 147 of the RP portion 146 to get a desired RP substrate with RP element 164 with a particular material 125).

This adjustment function also allows the user to try differing input materials 125 to get better functionality from the RP portion/element 164 of the finished 3D object/part 160.

Many different input materials 125 may be used in system 100 to achieve useful results with the RP element 164 (as well as provide adequate structural integrity and strength in portion 162). Generally, any plastic or polymer may be used that functions as an RP substrate such as at thicknesses 147 of less than about 1/16 inch. This would include all or nearly all common photopolymers used in stereolithography such as an epoxy-based resin or hybrid. In one tested implementation of system 100, the material supply 120 provided input materials 125 in the form of a liquid plastic that, when hardened, provided a white plastic (e.g., a white, molded ABS-like part), and it provided excellent RP substrate results at thicknesses of less than about 1/32 inches. Specifically, the input material 125 used in this test of a stereography machine for machine 110 was ACCURA® 55 plastic available from 3D Systems Corporation, Rock Hill, S.C., USA. However, it is likely that many other stereolithography (SL) materials may also be useful such as ACCURA® 25 or other SL materials from 3D Systems Corporation (or other distributors/manufacturers) or other SL materials. Further, good results have been achieved with plastics that have a white appearance, but other implementations may use a different color such as gray, tan, or another color (but typically not transparent/clear to achieve desired RP optical qualities).

Figure 2:
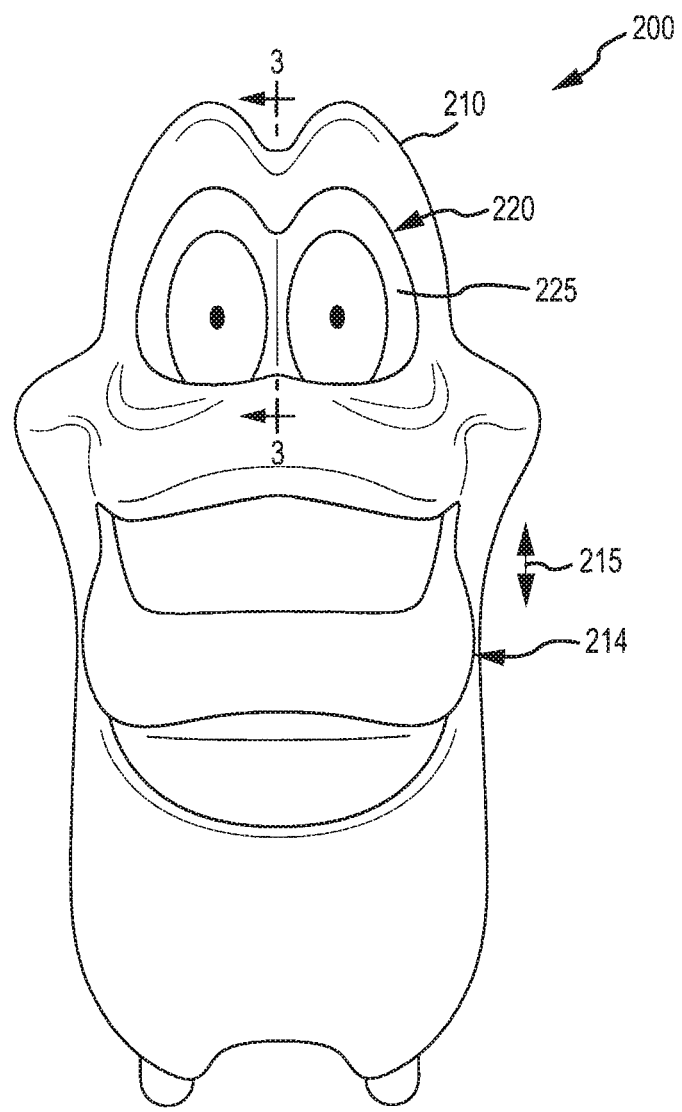
FIG. 2 illustrates a front perspective view of an assembly or object, such as an animatronic or robotic character, that includes an RP substrate formed using the techniques and systems described herein such as the fabrication system of FIG. 1.

FIG. 2 illustrates a front perspective view of an assembly or object 200 (e.g., an animatronic or robotic character) that includes an RP substrate formed using the techniques and systems described herein (e.g., the fabrication system of FIG. 1). The object 200 includes a body or support element 210 that may be formed as described above using a rapid prototyping machine, and the support element 210 may be formed to be relatively thick so as to provide structural strength and integrity for the object 200.

The support element 210 is shown to be a dimensional component (non-planar) with curved and irregular surfaces such as may be associated with a head and face of a human, an animal, or a character. The object 200, in this case, is an animatronic character, and the object 200 includes a positionable or actuable member 214 (e.g., a mouth or lower jaw of a mouth (as shown)) that can be selective moved up and down as shown with arrow 215. The support element 210 is formed of a material such as a plastic that can be formed using rapid prototyping techniques and is rigid and stiff to support the moving 215 member 214. For example, the support element 210 may be formed of a plastic that is at least about 1/16-inch thick such as the plastics that result from curing photopolymer resins used in an SL machine.

Figure 4:
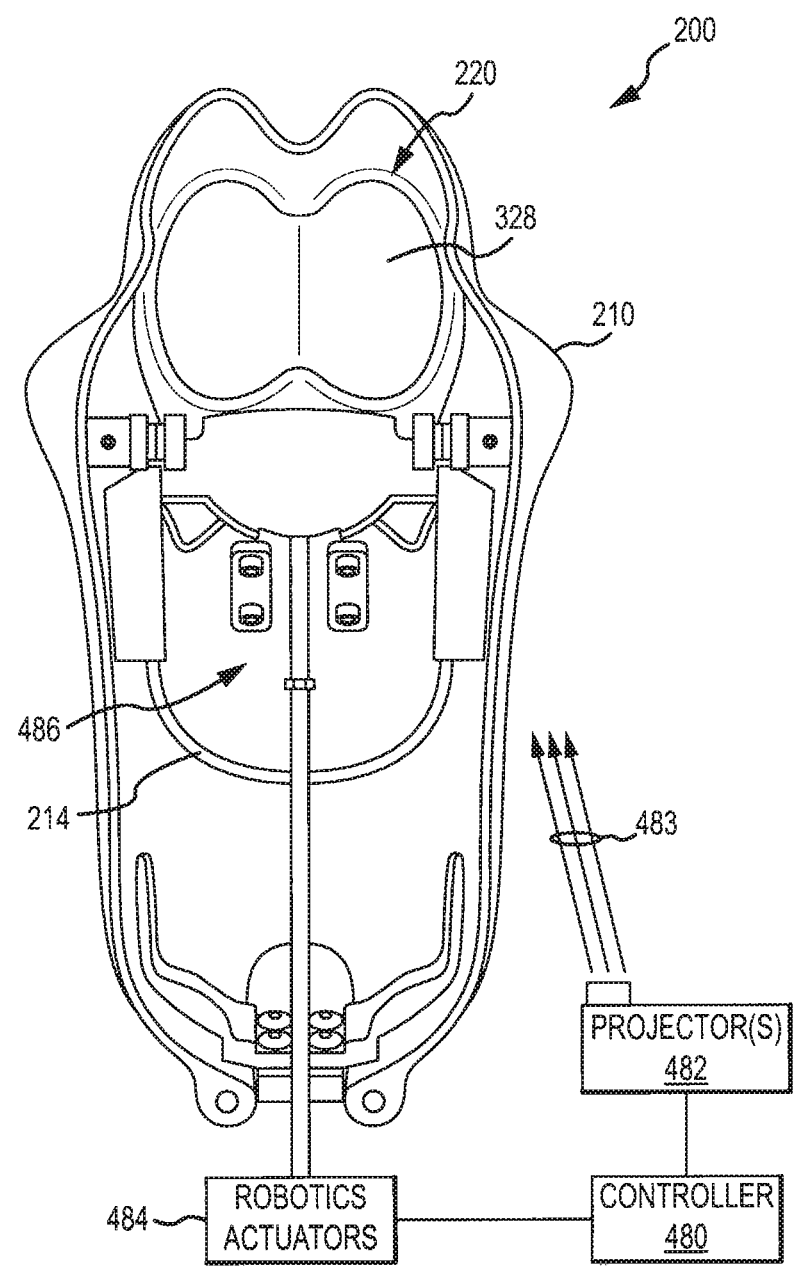
FIG. 4 is a rear perspective view with a rear cover/cap removed to show internal components of the assembly/object of FIGS. 2 an 3 and also with several components or features shown in functional block or schematic format.

Significantly, the object 200 is further animated through the use of a rear projector (e.g., shown at 482 in FIG. 4). Specifically, the object 200 includes an RP element or substrate 220 in the form of a pair of eyes provided as a single unit or piece. The front or outward facing surface or side 225 is Shown to be displaying images (e.g., portions of the eyes of the creature simulated by Object 200) as the object 200 is operated. During such operation, a rear projector 482 is operated to project light or an image stream onto a rear or inward face surface or side of the RP substrate 220 opposite the front surface 225.

The RP substrate 220 is formed of a material (such as white plastic) that is useful for providing an RP substrate (e.g., adequate opacity to not simply transmit light through the front surface 225) and also at a relatively small thickness to effectively transmit the images from the front surface 225 (e.g., at least translucent). For example, a white plastic formed using a UV-curable photopolymer and an SL machine may be used at a thickness of less than about 1/16 inches (such as 1/32-inch thick or thinner).

As discussed above, the use of rapid prototyping techniques to concurrently form the support element 210 and RP element 220 allows the RP element 220 to be formed integrally with the support element 210. As a result, there are no additional fabrication steps to cut a hole/gap for receiving the RP element 220, no steps required for separately fabricating the RP element 220, and no additional steps for bonding the RP element 220 to the support element 210. After stereolithography or other rapid prototype fabrication, the RP element 220 is integrally mated/joined with (or has bonded sides/edges with) the adjacent or, in this case, surrounding portions of the support element 210.

Further, the use of a thin white (or other color) plastic for RP element 220 typically alleviates the need for applying an RP or other coating to the rear surface of the RP element 220 (as was required when an RP substrate was vacuum formed from clear plastic). The use of rapid prototyping as described herein allows the RP element 220 to be formed of a much smaller thickness (such as about 50 percent or less) compared with the surrounding and supporting structural element 210.

Figure 3:
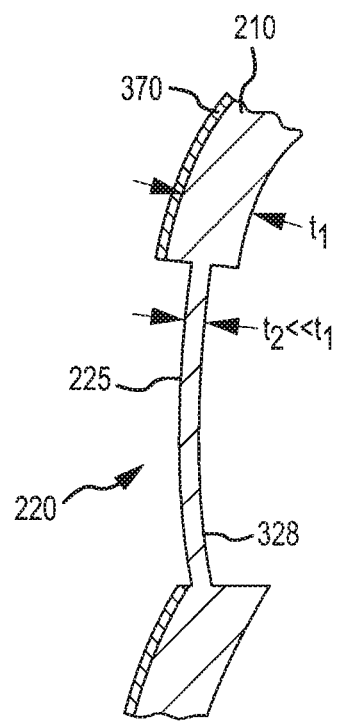
FIG. 3 is partial sectional view of the assembly of FIG. 2 taken at line 3-3 showing that the RP element or substrate is formed integrally with adjacent structural members or portions and is formed to have a different thickness and to not require additional coating/painting.

FIG. 3 illustrates a partial sectional view of the object or animatronic character 200. It shows a side view of the RP element or substrate 220 with its front surface or side 225 and a rear surface or side 328 that would face a rear projector (projector 482 in FIG. 4). FIG. 3 also shows a side view of adjoining portions or segments of the support element 210, and it can be seen that the support element 210 is mated with or integrally formed with the sides or edges of the RP element 220 to physically support or retain the RP element 220 within the object 200. While the RP element 220 typically requires no further RP coating or other treatments, the support element 220 may be unacceptable translucent or be a color (such as white) that is undesirable for the object 200. To provide a different color and/or to make the support element 210 more or fully opaque, a layer of paint 370 or a similar material/coating may be applied on the outer surface as shown or, in some cases, on the inner side/surface of the support element 210.

As shown, the support element 210 has a first thickness, $t_1$, while the supported RP element 220 has a second thickness, $t_2$ (both measured from a front/outer side to a rear/inner side). The first thickness, $t_1$, is chosen for structural/strength reasons while the adjacent or surrounded RP element 220 has a thickness, $t_2$, that is chosen mainly to provide an effective RP substrate (based on the particular material used to form the RP element 220). The use of rapid prototyping techniques such as stereolithography allows these two thicknesses to be provided with an integral or unitary (one piece) part, and the variance can be quite large. For example, the RP element 220 may have a thickness, $t_2$, that is less than about one half that of the support element 210 such as less than 1/32 inch when the support element is 1/16 inches or more thick. Of course, other thicknesses may be used to suit a particular projection/display effect desired, a display environment (how light or dark is the display environment), and so on. The particular values provided have, however, proven effective when the rapid prototyping machine is an SL machine and the liquid feed/input material is ACCURA® 55 (a white, UV-curable photopolymer).

FIG. 4 illustrates a partial rear or back view of the object 200 with several components shown in schematic or functional block format. As shown, the object 200 includes the structural/support element 210 that supports the integrally-formed RP substrate or element 220 (e.g., the animatronic character's eyes), with the rear or back surface/side 328 of the RP element 220 facing inward into the object 200. The object 200 also includes the movable/positional member 214 pivotally supported upon the support/structural element 210.

A controller or computer control system 480 is provided that selectively operates a projector 482 to project light or an image stream as shown at 483 onto the rear or back surface 328 of the RP element 220. This results in images being displayed upon the front surface 225 of the RP element 220 as shown in FIG. 2, and the projected images 483 may be still images or, more commonly, are video images (e.g., moving eyes in this example). The projector 482 is not limiting of the invention, and it may be nearly any projector (such as an LED or other micro/pico projector useful for providing a 100 to 1000 or more lumen output of still or video images that may be black and white or, more typically, color). The controller 480 may synchronize operation of projector(s) 482 and/or select the content 483 shown by projector(s) 482 based on operation of robotics actuator(s) 484. The robotics actuator 484 is interconnected with positioning mechanism(s) 486 so as to selectively (e.g., in response to control signals from controller 480) move or position the positionable member 214.

Figure 5:
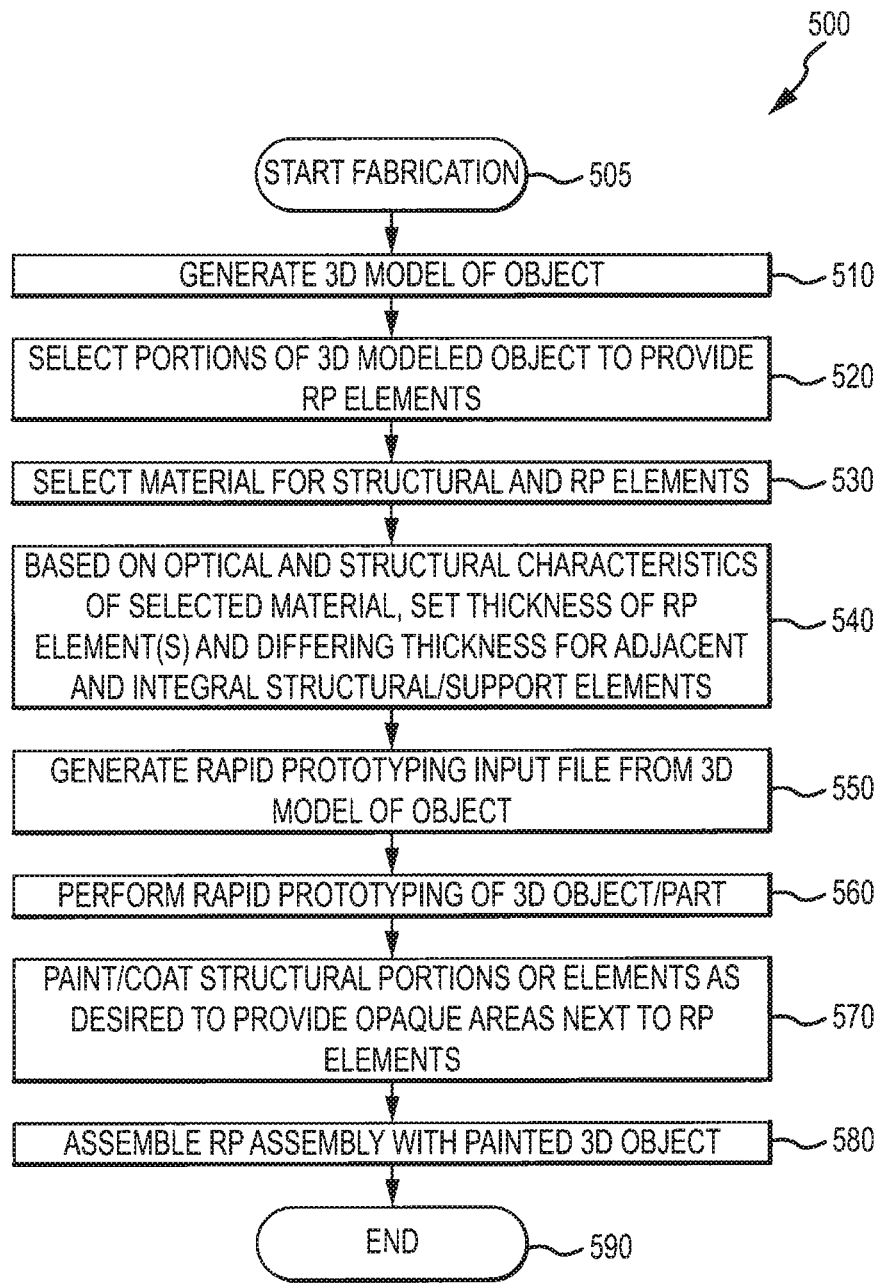
FIG. 5 illustrates with a flow diagram one exemplary method of fabricating an assembly or object, such as that of FIGS. 2-4, with a RP substrate or portion using rapid prototyping techniques.

FIG. 5 illustrates a method 500 of fabricating an object (such as object 160 or 200) that includes an RP substrate or element (such as RP element 164 or 220). The method 500 starts at 505 such as with selecting an object such as an animatronic or robotic character that will be the target of the method 500 and for which its eyes or another portion will be animated or otherwise used as an RP screen. At 510, the method includes generating a 3D model of the object. For example, a 3D scanning technique may be used to generate a 3D model or computer graphic file of the exterior surfaces of a 3D object (non-planar object) such as a model of a head or face of a character or a human face/head. Alternatively, a 3D model may be generated or otherwise provided by a CAD program (or other software program), as nearly any 3D model may be used as input to the method 500 and used to generate a part or model using rapid prototyping such as stereolithography.

At step 520, a user of the CAD or other program being used to generate the 3D model acts to select one or more portions of the 3D model for use as RP substrates (or RP screen components). For example, a head may be modeled and the entire head may be used as the RP substrate. In other cases, a portion of the face (or a subset of the 3D model) is used as the RP substrate such as the eyes as shown in FIGS. 2-4. In step 530, the method includes choosing or setting which rapid prototyping technique will be used (stereolithography or another technique) and, then, which of the many available materials for that technique will be used to form both the structural and RP substrates or elements. In the above example, a stereolithography machine was chosen and used to form the 3D object, and a white UV-curable photopolymer resin (or liquid plastic) was used as the feed stock or input materials for the SL machine. In other cases, though, a gray or tan liquid plastic may be used or another white photopolymer may be used other than the one discussed above (ACCURA® 55).

Based on the optical and structural characteristics of this selected input or feed material, step 540 involves setting thicknesses of the RP element(s) and the structural element(s). Typically, the RP elements will be much thinner than the adjacent or surrounding structural elements, but this is not required to practice the invention (such as when the thickness for the RP elements for the particular material and intended use of the 3D object are adequate to provide structural integrity for the structural/support elements). For example, the thickness (as measured from the outer surfaces defined by the 3D model) may be set at a value equal to or less than about $\frac{1}{32}$ inches for the RP elements and at a value equal to or greater than about $\frac{1}{16}$ inches for the structural elements (such as when a white plastic is used to grow/form the 3D object in the rapid prototyping machine). The thickness of the RP substrate generally may vary with factors such as the translucence of (or how transmissive to light) the plastic (or other material) and such as the display effect trying to be achieved in the 3D object/assembly. A more translucent material may require more thickness and vice versa (e.g., a gray plastic may be set to have smaller thickness than a white plastic).

At step 550, a rapid prototyping file is generated—such as by the prototyping machines software provided in its controller—from the 3D model of the object (including the differing thicknesses). For stereolithography, this may involve software operating to divide the 3D model into a plurality of very thin layers that can be separately grown/printed to form a 3D object/part based on the digital 3D model. At step 560, rapid prototyping (such as via use of an SL machine) is performed with the selected feed or input material and the rapid prototyping input file to form a 3D object/part that includes both the structural elements and the defined/selected RP substrates/elements. This step may also include providing supports/braces to support the sidewalls of the 3D object as it is being built, and then the removal of these supports/braces and, in some cases, cleaning of the 3D object to remove excess material. Further, step 560 may include post-formation steps such as additional curing of the overall 3D object/part.

At step 570, the structural portions or elements may be painted or otherwise treated to achieve a desired look and/or to make these elements/portions less transmissive or even opaque to light (e.g., the light of the rear-mounted or positioned projector when it projects on the RP substrate/element(s)). At step 580, the method 500 continues with assembling (as necessary or desired) the 3D object such as by providing one or more projectors that are focused upon the rear or back surface of the RP elements, by providing and connecting robotic or animatronic assemblies/components, by mounting part/object grown in rapid prototyping onto other support components/frames (e.g., mounting a head onto a body or the like), and so on to form a complete 3D object or assembly in which rear projecting may be performed on the RP substrate/element to display images (e.g., animate a portion of the 3D object or assembly during its use). At 590, the method 500 ends, and it may be repeated to create different objects using differing 3D models and/or differing materials and/or differing thicknesses for the RP substrate/element or structural components.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The use of rapid prototyping techniques such as stereolithography greatly simplifies the fabrication of a 3D object/assembly with an RP substrate/element (e.g., all or most can be done in one operation rather than multiple processes as required when the substrates are formed separately using vacuum forming or the like).

The methods taught herein significantly improve accuracy and reliability of the fabrication process, too. For example, the digital 3D model (with thicknesses of structural and adjacent/surrounded RP substrates defined) and prototyping input file (with the thin layers defined) can be used to provide nearly complete control over the thickness and shape of the 3D object with consistency of the material, which leads to consistency of transparency/opacity throughout the 3D object including in the RP substrate.

One drawback or feature that had previously taught away from the use of stereolithography for forming a rear projection surface is the lines that may be seen or formed in the RP substrate. The RP substrate preferably is very smooth (as is achieved with vacuum forming), but the use of stereolithography results in "lines" across the surface of the RP substrate as the substrate is grown one thin layer at a time. The size of these lines depends on the resolution of the particular stereolithography machine, and the inventor has tested machines with resolutions of about 0.020 inches per layer. This SL machine provide RP substrates with layers or "lines" that were fine enough to achieve a very useful rear projection surface/screen (again, using a white photopolymer such as ACCURA® 55 or the like). It is believed that higher resolution machines are desirable and likely will be available in the coming years, which will improve the results achievable with the method taught herein making it even more desirable for widespread implementation.

In some embodiments, the feed or input material used in the rapid prototyping may simply be a white or other color plastic/polymer. However, in other cases, it may useful to provide an additive to obtain enhanced optical properties and rear projection results. For example, the RP coating materials commonly used to coat the back surface of a vacuum formed, transparent part to provide an RP substrate may be added to the photopolymer to provide an RP substrate using stereolithography that is more desirable as an RP substrate (e.g., provides a brighter display with the same projector). Also, it may be useful to choose a stronger input or feed material to allow the RP substrate to be thinner (which also may provide a brighter output), e.g., a thickness of $1/64$ to $1/32$ inches may be achieved and useful in some cases.

I claim:

1. A method of manufacturing a three dimensional (3D) object with a rear projection (RP) screen or surface, comprising:
   providing a rapid prototyping machine;
   supplying a volume of input material to the rapid prototyping machine;
   providing a digital prototyping file to a computer control system configured to control the rapid prototyping machine; and
   with the computer control system, operating the rapid prototyping machine to form a 3D object using the input material based upon the digital prototyping file, wherein the 3D object includes an RP element with a rear surface and a front surface, the RP element being adapted for displaying an image via the front surface when light is projected upon the rear surface,
   wherein the 3D model includes an RP portion corresponding with the RP element and further includes a structural portion corresponding to a structural element, which is less transmissive of light than the RP element, with at least one side integrally and concurrently formed with an adjoining side of the RP element during the operating step and
   wherein the input material is a plastic selected to provide RP optical qualities, to the RP portion but not to the structural portion due to differing thicknesses of the RP and structural portions, including the displaying of the image via the front surface.

2. The method of claim 1, wherein the rapid prototyping machine comprises a stereolithography machine and wherein the digital prototyping file defines a plurality of layers of a 3D model that are separately formed by the stereolithography machine.

3. The method of claim 2, wherein the structural portion of the 3D model is associated with a first thickness and the RP portion of the 3D model is associated with a second thickness that is less than about one half of the first thickness, whereby the RP element formed by the stereography machine is more transmissive of light than the structural element.

4. The method of claim 3, wherein the first thickness is greater than about $1/16$ inches and the second thickness is less than about $1/32$ inches.

5. The method of claim 1, wherein the input material is a UV-curable photopolymer resin.

6. The method of claim 5, wherein the UV-curable photopolymer is selected to provide a translucent white plastic in the operating step.

7. The method of claim 1, wherein the method further including treating the structural element such that the structural element is less transmissive of light than the RP element.

8. A method of fabricating a 3D object with a portion adapted for use as a rear projection (RP) screen, comprising:
   generating a digital 3D model of an object;
   identifying a first portion of the 3D model as an RP substrate and a second portion adjacent the first portion as a structural support;
   setting a first thickness for the first portion and a second thickness greater than the first thickness for the second portion; and
   with a rapid prototyping machine, performing rapid prototyping using the 3D model to at least partially concurrently form a 3D object including an RP element with the first thickness and a structural element with the second thickness, whereby the structural element is less transmissive of light than the RP element,
   wherein each layer grown by the 3D printing machine is less than about 0.020 inches thick and
   wherein the RP element has at least one arcuate-shaped portion and has a substantially uniform thickness of less than $1/32$ inches across the arcuate-shaped portion.

9. The method of claim 8, wherein the RP element and the structural element are integrally formed of a translucent white plastic.

10. The method of claim 9, wherein the rapid prototyping machine comprises a 3D printing machine operating during the performing step to grow the 3D object layer-by-layer from a photopolymer resin.

11. The method of claim 8, further comprising providing a projector projecting video content upon a first surface of the RP element, wherein the RP element is at least partially transmissive of light whereby images associated with the content are displayed on a second surface of the RP element opposite the first surface.

12. A method of fabricating a 3D object with a portion adapted for use as a rear projection (RP) screen, comprising:
   identifying a first portion of a 3D model of an object as an RP substrate and a second portion adjacent the first portion as a structural support;
   setting a first thickness for the first portion and a second thickness greater than the first thickness for the second portion; and
   with a rapid prototyping machine, performing rapid prototyping using the 3D model to form a 3D object including at least partially concurrently forming a non-planar RP element with the first thickness and a structural element with the second thickness, the structural element includes at least one adjoining edge with the RP element to support the RP element within the 3D object and the RP element is capable of forming an image from projected light while being free of an additional RP coating on an exterior surface of the RP element.

13. The method of claim 12, wherein the RP element and the structural element are both integrally formed of a white plastic that is translucent when provided at the first thickness.

14. The method of claim 13, wherein the rapid prototyping machine comprises a 3D printing machine operating during the performing step to grow the 3D object layer-by-layer from a photopolymer resin.

15. The method of claim 14, wherein the first thickness is less than about 1/32 inches.

16. The method of claim 14, wherein each layer grown by the 3D printing machine is less than about 0.020 inches thick and wherein the RP element has a substantially uniform thickness across the arcuate-shaped portion.

17. The method of claim 12, further comprising providing a projector projecting video content upon a first surface of the RP element, wherein the RP element is at least partially transmissive of light whereby images associated with the content are displayed on a second surface of the RP element opposite the first surface.

18. The method of claim 12, wherein the second thickness is less than one half of the first thickness, whereby the RP element formed by the stereography machine is more transmissive of light than the structural element.

19. The method of claim 18, wherein the first thickness is greater than about 1/16 inches and the second thickness is less than about 1/32 inches.

20. The method of claim 1, wherein the method further includes treating the structural element after the performing rapid prototyping step whereby the structural element is opaque and the RP element is translucent to light.

* * * * *